United States Patent [19]

Willing

[11] Patent Number: 4,968,139
[45] Date of Patent: Nov. 6, 1990

[54] ILLUMINATING SYSTEM FOR THE VISUAL INSPECTION OF OBJECTS

[76] Inventor: Achim Willing, Schonathstrasse 4, 8604 Schesslitz-Burgellern, Fed. Rep. of Germany

[21] Appl. No.: 176,045

[22] Filed: Mar. 30, 1988

[30] Foreign Application Priority Data

Mar. 31, 1987 [DE] Fed. Rep. of Germany ....... 3710762

[51] Int. Cl.⁵ ............................................. F21V 13/02
[52] U.S. Cl. .................................... 356/237; 350/601; 356/241
[58] Field of Search ............... 350/601, 523, 319, 277, 350/319; 356/237, 241, 394; 250/237 R

[56] References Cited

U.S. PATENT DOCUMENTS

| | | | |
|---|---|---|---|
| 2,813,230 | 11/1957 | Fruengel | 250/237 R |
| 3,873,212 | 3/1975 | Shell | 356/394 |
| 3,944,336 | 3/1976 | Carr | 350/601 |
| 4,242,702 | 12/1980 | Kuni et al. | 356/394 |
| 4,300,835 | 11/1981 | Schiemann et al. | 356/334 |
| 4,325,636 | 4/1982 | Schiffner | 356/350 |
| 4,722,607 | 2/1988 | Anselment et al. | 250/221 |
| 4,791,534 | 12/1988 | Lindberg | 350/601 |

*Primary Examiner*—Richard A. Rosenberger
*Attorney, Agent, or Firm*—Arnold S. Weintraub

[57] ABSTRACT

An illuminating system for the visual inspection of objects is proposed, in which a partly reflecting mirror directing the radiation onto the object is arranged crosswise in the optical path of a light source. An observer optical path is directed onto the object over the side of the partly reflecting mirror remote from the light source. There is also a light trap arranged in such a way that it absorbs the residual radiation not directed onto the object, which passes through the mirror or which is reflected on the mirror surface remote from the object.

14 Claims, 2 Drawing Sheets

ILLUMINATING SYSTEM FOR THE VISUAL INSPECTION OF OBJECTS

BACKGROUND OF THE INVENTION

1. Field of the Invention

The invention relates to an illuminating system for the visual inspection of objects with a light source.

2. Prior Art

It is often necessary for the visual control of objects to adequately illuminate the latter, so that flaws or defects can be detected. It is thereby frequently necessary that the illumination must take place from the same direction as the observation. This is, e.g., the case when inspecting elongated cavities, such as pipes, or when loading printed conductor boards. According to the prior art the objects to be inspected are illuminated obliquely to ensure that the head of the observer is not in the optical path of the light source or the light source is not an obstacle or hindrance in the observation path. However, this leads to shadows or reflections occurring, which falsify the inspection result.

SUMMARY OF THE INVENTION

The object of the invention is, therefor, to provide an illuminating system for the visual inspection of objects through which there is no falsification of the inspection result by shadows or the like, while permitting a large-area illumination and the type of illumination can be adapted to the seeing or visual task or the object to be inspected.

According to the present invention a partly reflecting mirror is arranged crosswise in the optical path of a light source and directs the radiation on the objects to be inspected. The observer optical path is directed over the side of the partly reflecting mirror remote from the light source. A light trap absorbs residual radiation not directed onto the object.

Due to the fact that a partly reflecting mirror is arranged transversely in the optical path of a light source, the object can be observed from one side of the mirror, while the radiation of a light source positioned laterally of the observer can be deflected in the observation direction onto the other reflecting surface of the mirror or vice versa. As a result, behind the partly reflecting mirror, the direction of the optical path and the observation direction coincide, so that the object can be observed without falsification.

The invention provides a light trap which, as a function of the reciprocal positioning of observer and light source, absorbs the residual radiation not directed onto the object, which passes through the mirror or which is reflected on the mirror surface remote from the object. Thus, there is no spurious or stray radiation, which could lead to the formation of shadows or the like on the objects.

As a result of the illuminating system, it is also possible to completely satisfactorily illuminate in large-area manner large arrangements for visual inspection purposes and, as a result of the choice of light source, which can have both a parallel optical path and, also, a purely diffuse emission, the illuminating system can be adapted to the objects which are to be inspected. It is in particular possible to use the illuminating system for inspecting components on printed circuit boards or for loading such boards, e.g. in SMD technology, because there is shadowless illumination and glossy or mat components of the same reflectivity are identically evaluated and do not act in a darker or lighter manner as in the case of directional radiation. Thus when observing with a camera or a video eye or the like and possible following digital image processing, information differences can occur as a result of incorrect illumination, which could be confused with physical differences.

It is particularly advantageous that the light trap be constructed as a directionally reflecting front-surface mirror, which deflects the residual radiation onto an absorbing, e.g. black surface, the front-surface mirror being provided with a black coating, because through the deflection the possibility for a disturbing reflection is further reduced. Through the provision of a magnifying optics in the observer optical path in front of the partly reflecting mirror, the inventive illuminating system can lead both to a completely satisfactory illumination and to a completely satisfactory magnification.

Embodiments of the invention are described in greater detail hereinafter relative to the drawings, which show:

DESCRIPTION OF THE PREFERRED EMBODIMENT

Figure 1:
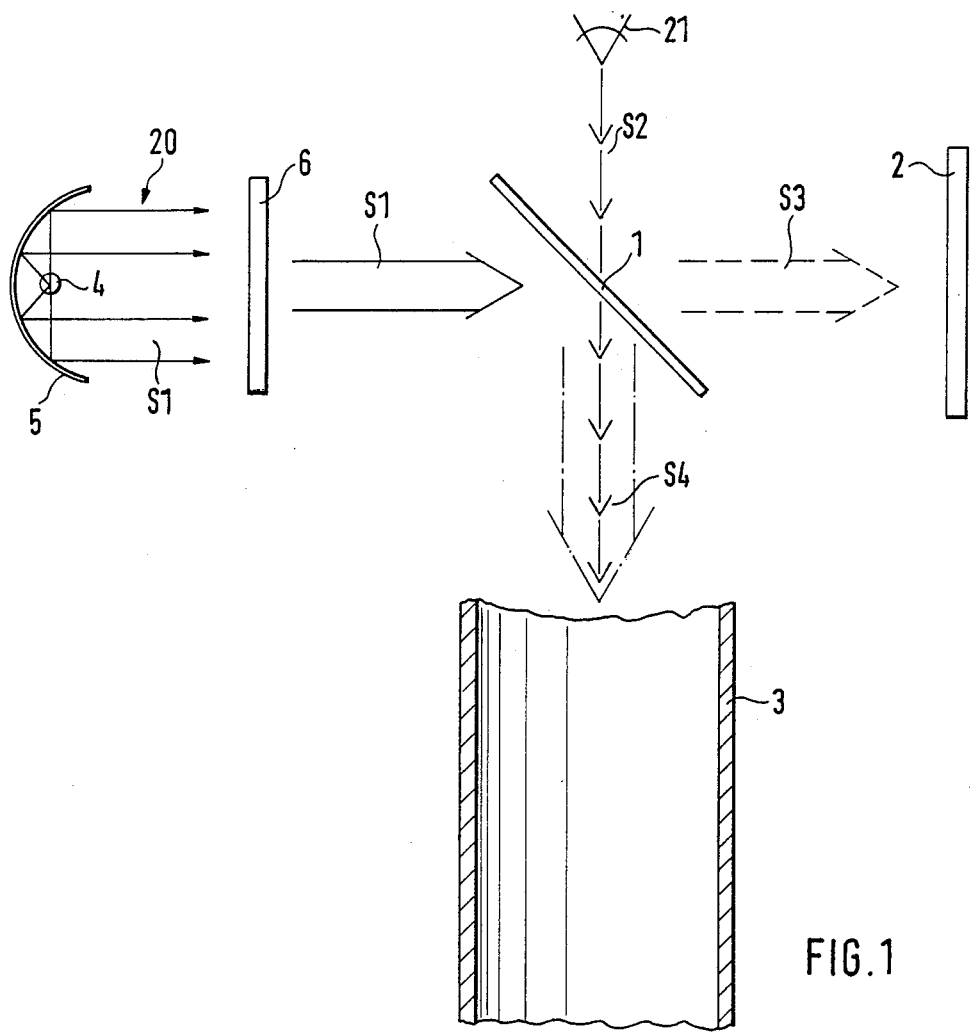
FIG. 1 is a diagrammatic representation of an embodiment of the illuminating system according to the invention for the illuminating and visual inspection of tubes.

FIG. 1 shows an illuminating system for the visual inspection of tubes. An important component is a partly reflecting mirror irradiating, for example, in an angle of approximately 45° from a light source 20 having illuminating optical path S1. The radiation is deflected by 90° on the partly reflecting mirror 1 and is passed into a tube 3 to be inspected or tested. With an observer 21 is associated an observer optical path S2, which just passes through the partly reflecting mirror 1, so that viewed by observer 21 behind said mirror 1 the observer optical path S2 and the illuminating optical path S1 coincide in a congruent optical path S4.

The radiation emitted by light source 20 is not completely reflected on the partly reflecting mirror 1 and instead part passes directly through the mirror, so that a spurious optical path S3 is formed. This spurious radiation could influence the viewing result, i.e. could have a prejudicial influence on the visual inspection. Therefore a light trap 2 is arranged in the spurious optical path S3 and is, for example, constructed as a black surface, which absorbs the light which occurs.

For the visual inspection of hollow cavities, such as pipes and tubes 3, a narrow beam; collimated or parallel radiation is frequently necessary. Therefore in this case the light source 20 is constructed as a narrowly focused light source, a lamp 4 being arranged in the focal point of a parabolic mirror 5, so that radiation reflected by the latter is parallel. Upstream of the parabolic mirror 5 in the observer optical path is arranged a heat-absorbing or heat-reflecting disk 6 made from transparent material. In another embodiment, as shown in FIG. 3, the parallel radiation is realized by means of a collective lens 7, which is irradiated by lamp 4.

For the visual inspection of components, which are, for example, arranged in SMD technology on printed circuit boards, or for the purpose of loading such boards, a shadowless, large-area diffuse illumination is required. The light source, according to FIG. 2 can be used for producing the diffuse illumination and, also, has a lamp 4 arranged in the focal point of a parabolic mirror 5 and the heat-absorbing or heat-reflecting disk 6. Behind disk 6 a diffusing screen 8 is arranged in optical path S1 and converts the directional radiation into diffuse radiation. In order that the diffuse radiation does not disturb the observer 21 in the observer optical path upstream of the diffusing screen 6 is placed a diaphragm constructed, for example, as a lamellar grating 9, whose surfaces (top) facing the observer 21 are black and whose surfaces (bottom) remote from the observer are white or have a good reflecting effect. A completely diffuse illumination can be obtained in large-area form with said light source 20.

Figure 3:
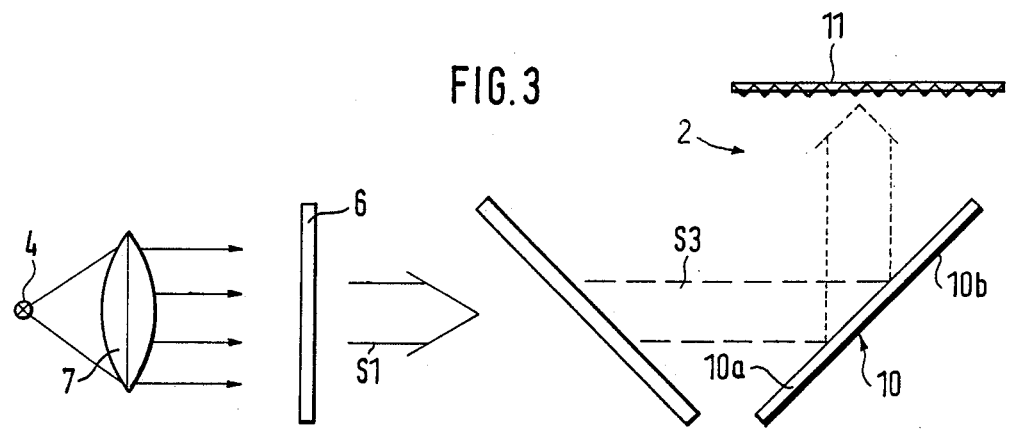
FIG. 3 is a diagrammatic representation of another embodiment of the inventive illuminating system.

As shown in FIG. 3 the light trap 2 comprises residual light reflector 10 and a light-absorbing disk 11. The residual light reflector 10 is provided with an exclusively directional, reflecting smooth surface and is made from a material absorbing the radiation in volume without any detectable dispersion, or from a radiation-transparent material.

The residual light reflector in this embodiment is in the form of a directional, reflecting and transmitting disk 10a, which is provided, on its side remote from the residual light optical path S3, with an optically directly engaging dark and, preferably, black coating 10b. The residual light radiation is reflected on the residual light reflector to a light-absorbing disk 11. The angle of reflector 10 with respect to the optical path axis is chosen in such a way that the residual radiation is, on the one hand, not retroreflected onto the partly reflecting mirror and, on the other hand, also, does not graze the axis viewing object-partly reflecting mirror 1-observer 21. The light-absorbing disk 11 is e.g. also constructed as a black surface.

Figure 4:
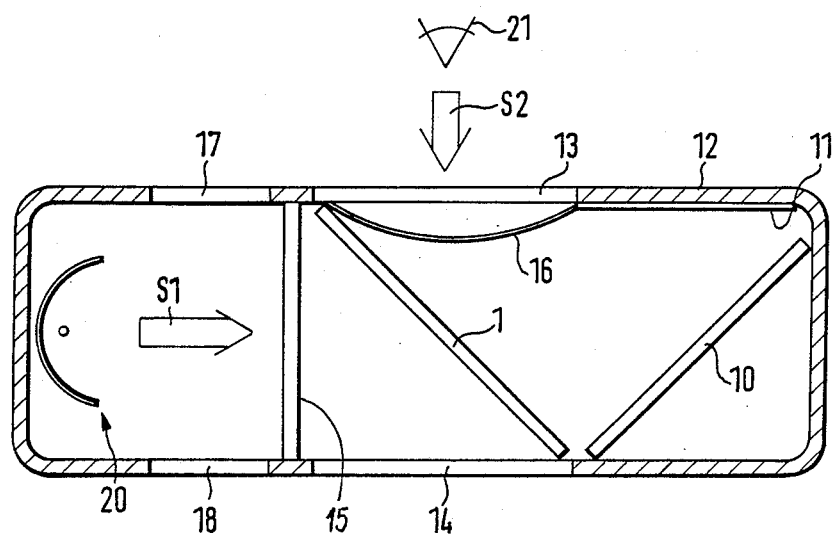
FIG. 4 is the arrangements of the inventive illuminating system in a casing.

FIG. 4 is a view of the illuminating system in a casing. Casing 12 is provided with two facing openings 13, 14, opening 13 facing the observer 21. At right angles and in sloping manner the partly reflecting mirror is arranged between the openings 13, 14 and to the left in the drawing plane is provided the light source 20, which can be partitioned by a transparent disk 15. At an acute angle to the right is provided the reflector 10 which deflects the radiation passing through onto the light-absorbing surface 11. For avoiding contamination or dirtying, the opening 13 is covered and the cover 16 can comprise an optical element such as a transparent disk but also, as indicated in FIG. 4, can comprise a magnifying optics or an imaging optics. Thus, in the case of good illumination, the object to be observed can be magnified. Opening 14 is not covered, so that there can be no disturbing reflections. Alongside the observer optical path S2 two facing, covered openings 17, 18 can be provided in the casing width their central axis intersecting the illuminating optical path S1. Thus, the object to be inspected can be observed in the case of another illuminating, e.g. general lighting, by swivelling the viewer or observer eye.

Although not shown in the drawing, it should be noted that the observer optical path S2 and the illuminating optical path S1 can be interchanged, so that the illuminating optical path passes through the partly reflecting mirror without deflection, while the observer optical path is deflected by the partly reflecting mirror. The observer is then positioned facing the side of the partly reflecting mirror, which is characterized by the residual radiation to be absorbed, i.e. the spurious radiation reflected on the partly reflected mirror.

In the embodiments the partly reflecting mirror is a planar, flat disk, but it can also be constructed as a prism or as some other non-planar mirror, which transforms the incident radiation.

If there is a magnifying glass, or an imaging optics, or a front window in the observer optical path, they should be bloomed i.e., coated to reduce reflection.

In place of an observer 21, there can also be a camera, video eye or the like, used for the "visual" detection of the object and e.g. the image of the camera can be further processed by digital image processing.

Figure 2:
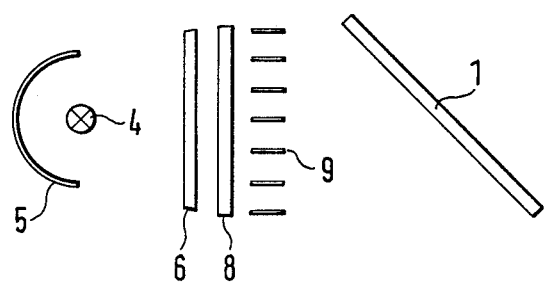
FIG. 2 is an embodiment for a diffuse light source.

Obviously the construction of the light source is not restricted to the constructions according to FIGS. 1 and 2 and it is possible to choose light sources with different light distributions and the light sources can also be lasers.

I claim:
1. An illuminating system for visual inspection of objects with a light source, characterized in that:
 (a) a partly reflecting mirror is arranged crosswise in the optical path of a light source and directs radiation onto an object being inspected;
 (b) an observer optical path is directed over the side of the partly reflecting mirror remote from the light source onto an object to be inspected;
 (c) a light trap is provided which is arranged is such a way that it absorbs residual radiation not directed onto an object to be inspected, which passes through the partly reflecting mirror or which is reflected on the surface of the partly reflecting mirror remote from the object; the light trap having a directional, reflecting, non-volume dispersing front-surface mirror, which deflects the residual radiation onto an absorbing surface; and,
 (d) the light source, partly reflecting mirror and light trap being arranged in a casing with two facing openings,
  (1) between which the partly reflecting mirror is arranged in a sloping manner,
  (2) one opening facing an object to be inspected and being open, and
  (3) the other opening being covered by an optical element.

2. An illuminating system according to claim 1, characterized in that the light trap is constructed as a, black surface.

3. An illuminating system according to claim 1, characterized in that the front-surface mirror comprises a directionally reflecting and transmitting disk, which is provided on one surface with a black coating.

4. An illuminating system according to claim 1, characterized in that magnifying optics are arranged downstream of the partly reflecting mirror in the flow of light from the light source.

5. An illuminating system according to claim 1, characterized in that imaging optics are arranged downstream of the partly reflecting mirror in the flow of light from the light source.

6. An illuminating system according to claim 1, characterized in that the light source is constructed in such a way that it emits a narrow beam of parallel radiation.

7. An illuminating system according to claim 1, characterized in that the light source emits diffuse radiation.

8. An illuminating system according to claim 7, characterized in that a diaphragm for shielding against direct sighting is arranged downstream in the flow of light of the diffuse-radiating light source.

9. An illuminating system according to claim 1, characterized in that the covered end opening is covered by a transparent disc.

10. An illuminating system according to claim 1, characterized in that the observer optical path is defined by the openings, and then is provided a further observer optical path, which is formed by two additional facing openings, the central axis of the latter openings intersecting the illuminating optical path.

11. An illuminating system according to claim 1 wherein the optical element is bloomed.

12. An illuminating system according to claim 1 characterized in that the covered opening is covered by a magnifying optics.

13. An illuminating system according to claim 1 characterized in that the covered opening is covered by an imaging optics.

14. An illuminating system for the visual inspection of objects with a light source, characterized in that:

(a) a partly reflecting mirror is arranged cross wise in the optical path of a light source and directs radiation onto an object to be inspected;
(b) an observer optical path is directed over the side of the partly reflecting mirror remote from the light source onto an object to inspected; and
(c) a light trap is provided which is arranged in such a way that it absorbs residual radiation not directed onto an object to be inspected, which passes through the partly reflecting mirror or which is reflected on the surface of the partly reflecting mirror remote from the object;
(d) the light source, partly reflecting mirror and light trap being arranged in a casing with two facing openings,
  (1) between which the partly reflecting mirror is arranged in a sloping manner,
  (2) one opening facing an object to be inspected and being open, and
  (3) the other opening being covered by an optical element; and
(e) a further observer optical path, which is formed by two additional facing openings, the central axis of the latter openings intersecting the illuminating optical path.

* * * * *